United States Patent [19]

Vaughan

[11] 4,090,370

[45] May 23, 1978

[54] ENVIRONMENTAL CONTROL SYSTEM

[76] Inventor: Kenneth F. Vaughan, 3610 Michelle Dr., Torrance, Calif. 90503

[21] Appl. No.: 665,968

[22] Filed: Mar. 11, 1976

[51] Int. Cl.² ............ F25D 17/06; F28D 3/00; F28D 5/00; B01F 3/02
[52] U.S. Cl. ............ 62/91; 62/171; 62/314; 236/44 C
[58] Field of Search ............ 62/90, 91, 121, 305, 62/310, 314, 316, 171; 236/44 C

[56] References Cited

U.S. PATENT DOCUMENTS

| 705,321 | 7/1902 | Colwell | 62/314 |
|---|---|---|---|
| 1,518,162 | 12/1924 | Parkinson | 236/44 C |
| 2,045,215 | 6/1936 | Coverston | 62/314 |
| 2,074,642 | 3/1937 | Coverston | 62/314 |
| 2,582,986 | 1/1952 | Haertel et al. | 62/171 |
| 2,725,729 | 12/1955 | Mills | 62/314 |
| 3,214,936 | 11/1965 | Di Peri | 62/314 |
| 3,743,009 | 7/1973 | Dagerford | 236/44 C |
| 3,776,214 | 12/1973 | Coffman | 236/44 C |
| 3,877,244 | 4/1975 | Di Peri | 62/314 |
| 4,002,040 | 1/1977 | Munters et al. | 62/314 |

Primary Examiner—Lloyd L. King
Attorney, Agent, or Firm—Fraser and Bogucki

[57] ABSTRACT

An environmental control unit for regulating humidity and temperature and removing certain constituents from air in a generally confined volumetric region comprises an enclosure having an actuable heating element associated with a blower driven dry air flow path extending through a plurality of parallel high thermal conductivity tubes to an outlet opening to the confined volume. Water may be sprayed by an actuable pump from a reservoir onto a high-surface area evaporative covering on the tubes. A blower driven evaporation path in heat exchange and non-fluid exchange relationships to the dry air flow path extends generally transverse to the tubes about the evaporative covering and through controllable vents to humidify by expelling evaporation path air into the confined volume, and to dehumidify or cool by condensing room air moisture within the chilled tubes. A temperature and humidity responsive control unit is integrally coupled to selectively actuate the controllable vents, the blowers, the pump and the heating element. Heat loss energy from the dry flow path blower motor drives a refrigeration loop including chill tubes coupled to reduce reservoir water temperature to enable cool air exiting the unit to drop below the wet-bulb temperature of the covered tubes. This arrangement is compact, requires low power, and is economical, but can purify and dehumidify, humidify, cool or heat air in a room with substantial efficiency.

34 Claims, 13 Drawing Figures

ENVIRONMENTAL CONTROL SYSTEM

BACKGROUND OF THE INVENTION

1. Field of the Invention

This invention relates to humidity and temperature control systems. More particularly, this invention is directed to an integral climatic environment control unit which humidifies, dehumidifies, cools and heats and scrubs air to control a confined volumetric region in which the unit is located.

2. Description of the Prior Art

Apparatus which regulates the temperature and humidity and polluting constituents of rooms or other confined regions are desirable in numerous applications. For example, in certain darkrooms for processing photographic materials, temperature must be regulated, both to prevent deterioration of chemicals, deterioration or fogging of photosensitive film or paper and to help regulate chemical processing temperatures. Darkroom humidity also requires control, because high humidity has a deleterious effect on photosensitive materials, while excessively low humidity is conductive to the build up of static electric charges which may result in fogging from sparks.

Other environments in which temperature and humidity must be regulated include chemical processing plants and laboratories where highly sensitive electronic or other scientific equipment is used and in greenhouses for the growing of plants. Hospital rooms often require humidity and temperature regulation. Noxious fumes in numerous laboratories and plants necessitate substantial removal for the health and safety of workers.

Some of the problems associated with achieving climatic control involve convenience, installation expense and energy utilization in operation. Central heating and refrigeration require large capital outlays for installation. Operating expenses of a central heating and air conditioning, humidification and dehumidification system are costly. Electrical power utilization is high both because of the use of low efficiency compressors and heat exchangers and also lengthy ducting. Such systems are permanently installed and may not be conveniently relocated to other areas.

Current known portable units for altering climatic conditions may provide humidification, heating, cooling, dehumidification or air scrubbing but do not integrate all these operative features to efficiently control the overall climatic condition of a room.

SUMMARY OF THE INVENTION

A humidity and temperature control system for an enclosed volume generally comprises a plurality of heat exchange tubes having exterior evaporative surfaces. Two separate and distinct flow paths are established, one exterior and the other interior to the tubes, and means responsive to a temperature and humidity sensors are provided for selectively establishing air flow in the flow paths. Means are also provided for selectively controlling admittance of air that is exterior to the tubes into the enclosed volume. The evaporative surfaces are used either to provide a direct flowwater vapor exchange, or a thermal exchange which effects cooling or dehumidification.

In a preferred example, a dry air flow path communicating with a confined volumetric region or room is established by two groups of tubes, one providing a forward flow direction and the second group of tubes providing a reentrant flow direction, and a plenum chamber transferring air between the first and second groups of tubes. A centrifugal blower communicating with the second group of tubes forces air through the dry air flow path. Means are provided for directing a water spray on the exterior evaporative surfaces under certain modes of operation. An inlet admits air to the enclosure and an axial-centrifugal blower forces air through the evaporation flow path exterior to the tubes which air may be expelled from the enclosure through one of two controllable outlet vents. A first vent directs the evaporative flow path air to the exterior of the confined volume, in the dehumidification and cooling modes. In these modes, moisture from room air in the dry flow path condenses in the evaporation chilled tubes and dehumidified air is directed into the room. Actuation of the heating element compensates, when needed, for the cooling effect of dehumidification. The second outlet vent directs air from the evaporative flow path directly into the room for humidification. High and low temperature humidity sensors are coupled to selectively actuate the two vents, the blowers, the water spray dispensing means and a heating element associated with the dry air flow path blower to selectively operate the unit in modes of dehumidification, humidification, cooling and heating, and suitable combinations of these. Demand operation without the necessity of compressors limits energy consumption, and all modes are integrally provided in a portable compact structure.

Additional features of systems in accordance with the invention include high thermal conductivity plastic tubes having a metal particulate interspersed therein and a pair of header plates having an apertured array for rapid tube placement in the evaporative structure. Water is delivered by a reservoir fed pump to apertured channels spraying water overgauze padding surrounding the tubes to provide the desired high area evaporative surface. These elements are arranged in an easily assembled, low cost configuration. In the evaporation flow path a mixed flow blower and a plenum of selected volume and configuration distribute air uniformly among the tubes for efficient heat transfer. A solenoid operatively associated with the first and second vents opens and closes the vents in opposition to one another to direct evaporation flow path air either into or out of the confined volume. An apertured baffle interposed between the inlet and the first controllable vent and extending normal to a number of tubes lengthens the evaporative air flow path when the first vent is in an open position. Adjacent the evaporation path inlet an auxiliary inlet allows air from within the room to be recirculated through the evaporation path, increasing humidification efficiency. Means are provided for selectively directing air from the evaporation flow path to the dry air flow path to further chill evaporation path chilled air. A sensor is operatively coupled to deactuate the heating element when excess temperatures are sensed and a level sensitive mercury contact switch is operatively coupled to disconnect power when the unit is tilted. Refrigerant conduit is in heat exchange relationship to the dry flow path blower motor to absorb operating heat loss energy. The conduit is coupled to expand refrigerant in evaporator chill tubes immersed within the water reservoir to chill the water and output air below the wetbulb temperature of the evaporative surfaces.

BRIEF DESCRIPTION OF THE DRAWINGS

A better understanding of the invention may be had by reference to the following description taken in conjunction with the accompanying drawings in which.

DETAILED DESCRIPTION

Figure 1:
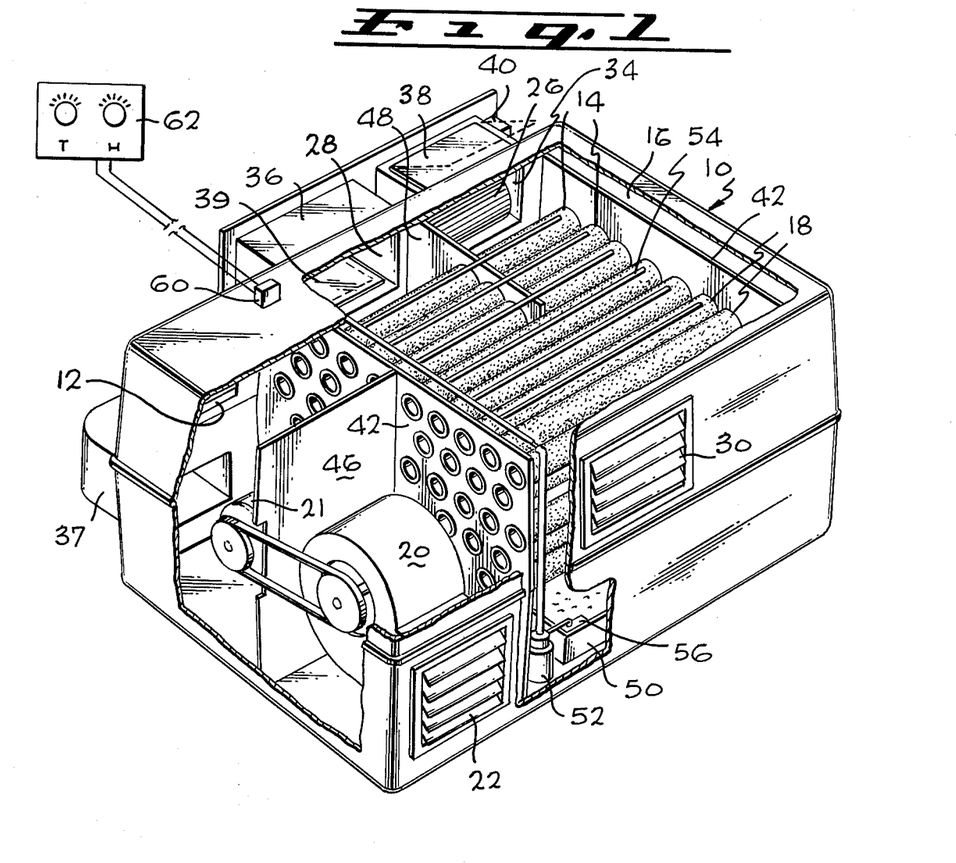
FIG. 1 is a perspective view with portions exposed and portions broken away showing the construction of a climate environment control unit in accordance with this invention.
Figure 2:
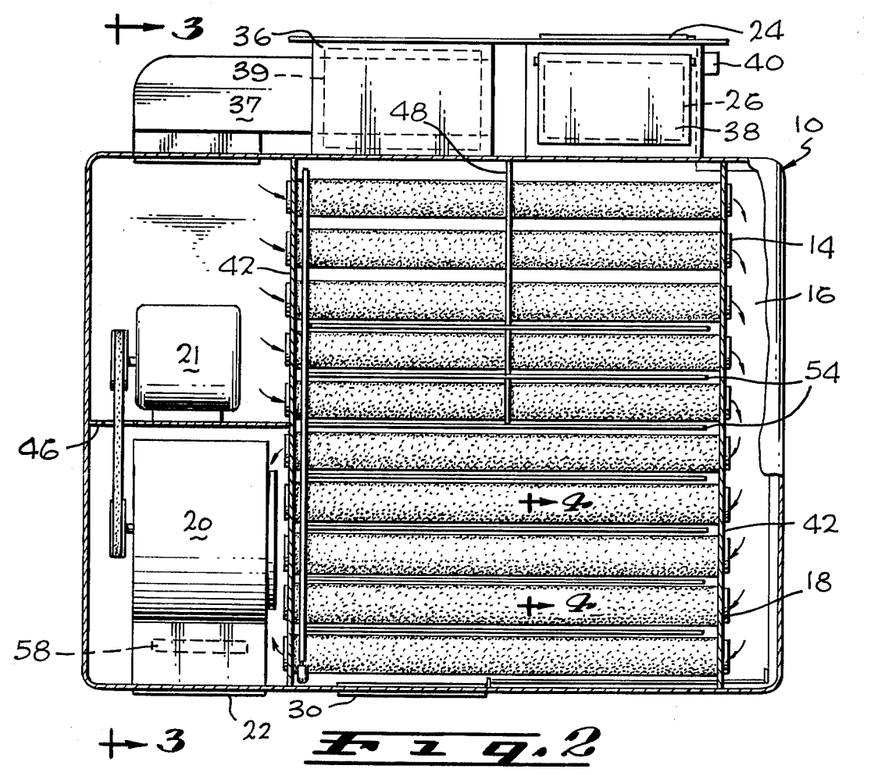
FIG. 2 is a top elevation plan view of the unit depicted in FIG. 1 with portions exposed and portions broken away.
Figure 3:
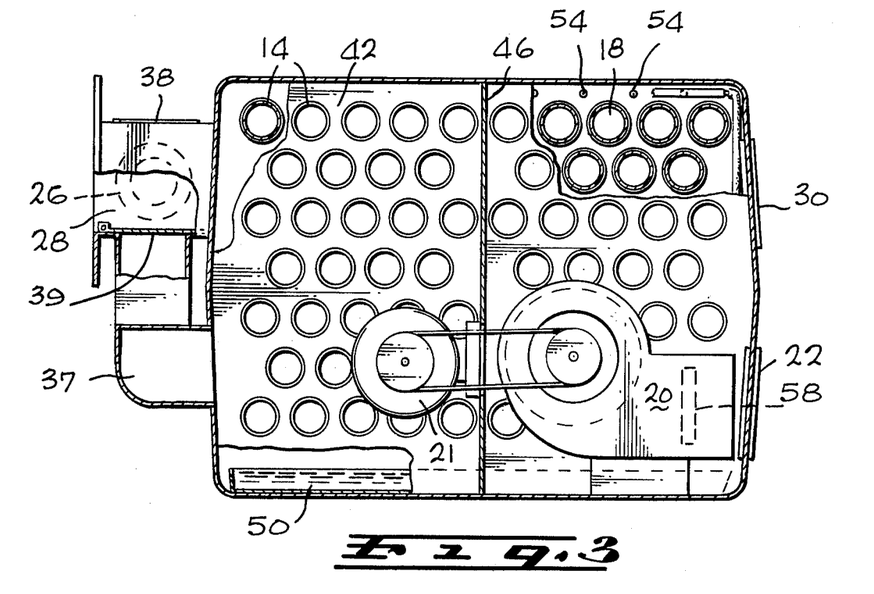
FIG. 3 is a cross-sectional view with portions exposed and portions broken away of the invention depicted in FIG. 1 taken along lines 3—3 of FIG. 2.

An example of a climatic environment control unit in accordance with the invention and with particular reference to FIGS. 1, 2 and 3, generally comprises a partitioned housing or enclosure 10 having various air passageways to provide a dry air flow path and an evaporation flow path. The dry air flow path includes in series an inlet 12, a first group of parallel-oriented elongated tubes 14, a plenum chamber 16, a second group of parallel-oriented tubes 18, a blower 20 and an outlet 22.

The evaporation flow path includes an inlet 24 to the enclosure 10, a blower 26 adjacent the inlet 24, a first controllable vent 28 adjacent the inlet 24 and a second controllable vent 30 remote from the inlet. The evaporation path passes over and about water suspensible covering or gauze padding 32 surrounding each of the tubes 14, 18. The first vent 28 expells humidified air which has passed through the evaporation path external to the room in which the unit is located. The second vent 30 is for directing humidified air into the room in which the unit is situated during humidification modes and during cooling modes when humidification of the room is not desired.

The enclosure 10 comprises a lower shell and an upper shell, typically of high impact plastic or sheet metal. The enclosure 10 is designed so that the upper shell is separable from the lower shell to gain access to the interior for easy maintenance. Various inlet and outlet vents are located in a number of apertures in the enclosure 10. The dry air flow path inlet 12 and the dry air outlet 22 are located on opposite sides adjacent one sidewall of the enclosure 10. The inlet 12 and the outlet 22 are spaced apart so that dry flow path air expelled from the unit is diffused through the room rather than being immediately recirculated into the unit. The outlet 22 has a three position louver to adjust the volume and direction of dry flow path air entering the room. In some applications, as the outlet opening is reduced, the heat exchange efficiency may be increased.

The enclosure 10 comprises a forward extending portion adjacent the inlet 12. The forward extending portion comprises an evaporation path inlet duct 34 including inlet 24 and an evaporation path outlet duct 36 including the first controllable vent 28. A plate joined to and framing both ducts 34, 36 facilitates mounting or placement of the entire unit in such a manner so that the inlet and outlet ducts 34, 36 are in communication with baffling or ducting extending outside the confined volume. The inlet duct 34 and the outlet duct 36 are adjacent one another for mounting convenience. The outlet duct 36 is adjacent the dry flow path inlet 12 so that evaporative path air may be easily directed back through the dry flow path in an efficient chilling mode.

The inlet duct 34 has a manually movable hinged plate 38 defining an auxiliary inlet, best viewed in FIG. 3 in which the plate 38 is extended in an open position. The auxiliary inlet, when open, allows recirculation of room air through the evaporation path for more efficient humidification.

The dampened padding 32 collects dust and certain pollutants from the air passing through the evaporation path. Preferably, the padding 32 fits loosely about the tubes 14, 18. Mechanical agitation by air flow prevents rapid build up of pollutants on the padding 32 and tube surfaces. Air impurities are absorbed in water droplets and are released by agitation and under gravity from the padding, descending to a reservoir. This feature is particularly beneficial when it is desirable to minimize certain constituents in the room air. For example, ammonia generally present where blue-line copying machines are used, may be substantially removed from room air by applicant's invention. Especially when the ducts 34, 36 are not coupled to an external air environment, room air circulates through the evaporation path and an air scrubbing effect occurs. Scrubbing is particularly noticeable when the auxiliary inlet is opened to allow recirculation of room air through the evaporation path. Scrubbed room air is returned to the room in humidification modes. Additionally, a certain amount of dust and chemical air constituents are removed in the tubes 14, 18 of the dry flow path during dehumidification and cooling modes.

The evaporation path outlet duct 36 is coupled by a transfer duct 37 to the dry flow path inlet 12 to selectively admit humidified evaporation flow path air to the dry air flow path. Dry flow path air is thereby efficiently chilled to approximate the temperature of the tube coverings 32. A mechanical damper 39 in the transfer duct 37 coupled between the outlet duct 36 and the inlet 12 causes the outlet duct 36 to close when air flows through the transfer duct 37 to the inlet 12 and open when the inlet 12 is closed to the transfer duct 37. The damper 39 or other transfer access means may be controlled by a solenoid coupled to a control circuit to operate when particular low humidity and high temperature conditions are sensed. Also, it may be desirable to eliminate the evaporation path blower in some versions of the invention and utilize a single blower in the dry air flow path to suck air through both the evaporation and dry air flow paths. The dry air flow path inlet 12 in such units would generally be blocked to room air.

The second controllable vent 30 is disposed on the enclosure remote from and opposite the first controllable vent 28. The second controllable vent 30, when open, is used to direct humidified air which has passed through the evaporation path into the room in which the unit is located. The first and second controllable vents are louvered and are controllable by the actuation of a solenoid 40. The solenoid is operatively coupled to the first and second controllable vents 28, 30 to open and close in opposition to one another. Thus, when the first vent 28 is open, the second vent 30 is closed, and when the second vent 30 is open, the first vent 28 is closed. In this example, the solenoid 40 is directly coupled to the first vent 28 while a cable couples the solenoid plunger to actuate the second vent 30. Actuation and deactuation of the solenoid 40 thus causes air flowing through the evaporation path to either be directed outside the room or inside the room.

A pair of spaced-apart, apertured header plates 42 are disposed upright within the enclosure 10, normal to the tubes 14, 18 and framing the evaporation path inlet 24 and outlet vents 28, 30. The header plates 42 are vacuum-formed plastic sheets having a two dimensional array of spaced-apart, apertures tapering normal to the sheets. Tapered tubular flanges 44 extend about and define the apertures, as best viewed in FIG. 5. The tubes 14, 18 may be readily fitted in sealing relationship within the apertures of the flanges 44 so that dry flow path air remains separate from evaporation flow path air. Expansion rings disposed within adjacent ends of the tubes 14, 18 aid in assuring a sealing fit. The header plates 42, with their protruding flanges 44 facilitate fabrication and maintenance of the evaporative structure. The gauze padding 32 covering the tubes 14, 18 generally requires replacement at regular intervals primarily resulting from the accumulation of dust and pollutants. The top shell of the housing 10 may be lifted and the entire evaporative structure including the padded tubes 14, 18 and the header plates 42 is removable. The plates 42 are readily separated from the tubes 14, 18. Upon renewing the padding 32, the tubes 14, 18 may be positioned between the header plates 42 and the evaporative structure replaced in the enclosure 10. In some situations, it may be more convenient to replace the entire evaporative structure, being of low cost plastic. If desired, the evaporative structure may be rejuvenated at a remote location.

One of the header plates 42 is spaced apart from the upright side of the enclosure 10 adjacent the dry air flow path inlet and dry air flow path outlet. A baffle 46 disposed upright, normal to the one header plate 42 and extending from the header plate 42 to the enclosure 10 separates the volume between the dry air flow path inlet 12 and the dry air flow path outlet 22 into an inlet chamber and an outlet chamber. The baffle 46 divides the tubes 14, 18 into two groups, those which are in fluid transfer relationship to the inlet chamber and those which are in fluid transfer relationship to the outlet chamber.

The other header plate 42 is spaced apart from the end of the enclosure adjacent the controllable vents 28, 30 to define the plenum chamber 16 to transfer air which has passed through the first group of tubes 14 to the second group of tubes 18. This header plate 42 is spaced apart a sufficient distance to prevent uneven flow distribution among the various tubes 14, 18 and a high impedance in the dry air flow path. However, the plenum chamber 16 is sufficiently narrow that it does not contribute appreciably to the outside dimensions of the unit.

An apertured baffle 48 disposed upright and located normal and adjacent to the inlet and outlet ducts 34, 36 of the evaporation path and having a portion of the tubes 14, 18 disposed within its apertures prevents short-circuiting of air through the evaporation path to the outlet duct 36.

Figure 4:
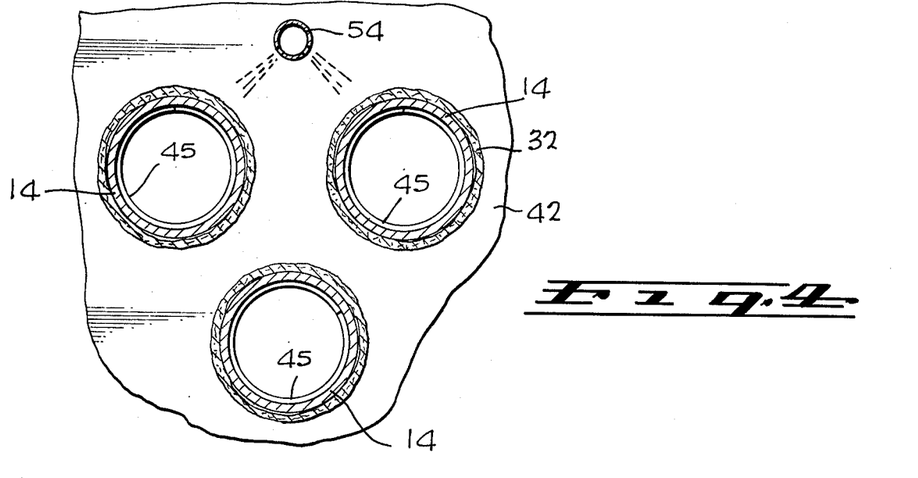
FIG. 4 is a cross-sectional view of a portion of this invention taken along lines 4—4 of FIG. 1.
Figure 5:
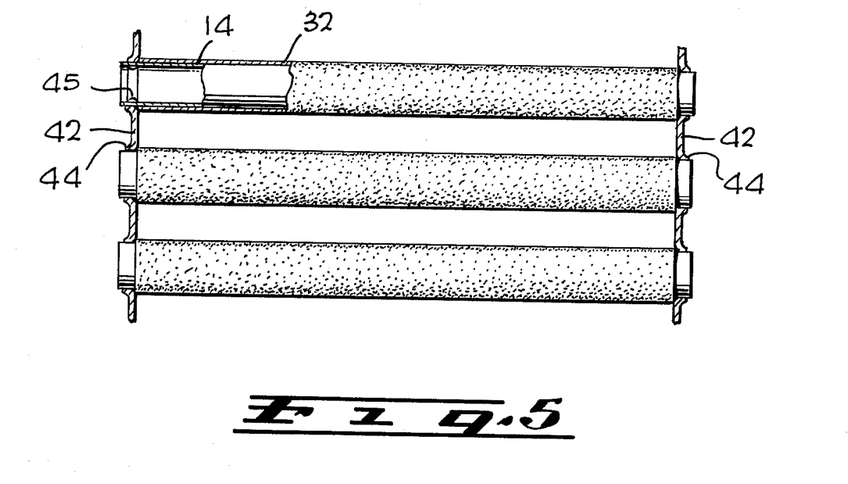
FIG. 5 is a perspective view of a portion of the example depicted in FIG. 1 with portions exposed and portions removed.

As best viewed in FIGS. 3, 4 and 5, plural flow path channels are provided by the round tubes 14, 18. A replaceable cylindrical gauze padding 32 surrounds each tube 14, 18. The tubes are of semi-flexible butyrate thermoplastic material having fine particles of aluminum dispersed therein. The plastic material is substantially inert preventing corrosive activity which would otherwise be troublesome especially when used in a somewhat acidic or alkaline vapor environment. Aluminum embedded in the tubes promotes high heat conductivity. Thermal conducivity is further aided by the thinness of the tubes; however, the tubes have sufficient thickness to be self-supporting between the header plates 42. Alternatively, thin aluminum tubes coated to inhibit corrosion may be used.

The padding 32 is sufficiently thick and porous to absorb water, yet is thin enough so as not to hinder efficient evaporation cooling and heat exchange. A slight amount of spacing between padding 32 on tubes 14, 18 in the evaporative array facilitates air passage in the evaporative flow path, eliminating the necessity for a higher power blower which would be required if padding 32 between tubes 14, 18 were in contacting relationship.

The padding 32 is sprayed and wetted by an evaporant or water dispensing system which includes a water reservoir 50, a reservoir fed pump 52, apertured irrigation channels 54 disposed in spaced-apart relationship over the padded tubes 14, 18 and conduit coupling the pump 52 to the apertured irrigation channels 54. A feed-water float 56 supplies water to the pump and disconnects the pump if insufficient water remains in the reservoir. The reservoir may be coupled to a water supply for continuous usage. An outlet coupled to the reservoir (not shown) may be used to continuously drain water at a slow rate to eliminate or reduce the concentration of noxious chemicals in the reservoir 50 collected from the confined volume. Chemical additives such as wetting agents, fungicides, deodorizers and medicaments may be added to the reservoir for diffusion to the confined volume. A water collection pan (not shown) disposed in the plenum 16 may be used to collect water condensed in the tubes 14, 18 during dehumidification modes and to return this water to the reservoir. In some applications where portability is desired, a self-contained gravity feed water supply rather than external reservoir connections may be used. To avoid operation causing water spillage in the unit by water escaping from the reservoir, and as a safety feature, a level-sensitive mercury contact switch (not shown) is operatively coupled via a relay to disconnect power from the unit when the unit is tilted.

Disposed within the outlet chamber of the dry air flow path in fluid transfer relationship with the second group of tubes 18 is the centrifugal blower 20. The output of the centrifugal blower 20 is disposed adjacent to the dry air flow path outlet 22 to expell air to the confined volume. The blower 20 is of the type which has a plurality of blades located radially about a circle, the circle being normal to the tubes 18 to suck air through the dry air flow path. A heating element 58 is disposed adjacent the blower 20 to provide warm air to the confined volumetric region when needed. The heating element 58 is located in the outlet chamber to avoid undesirable heating of the air in the tubes 14, 18. A motor 21 is belt coupled to remotely drive the blower 20 in the outlet chamber. The motor 21 is disposed in the inlet chamber so that any air temperature rise from the heat of the motor 21 may be treated by passage through the tubes 14, 18 when in a cooling mode. Generally, the tubes 14, 18 have a substantial heat transfer capacity and may chill air at a greater volume flow rate than passed through the tubes 14, 18.

The blower 26, disposed within the evaporation flow path, is of the axial-centrifugal mixed flow type. The blades of the blower have a skewed axial orientation circularly disposed about an axis to direct air flows not only normal to the evaporation path inlet 24 but also parallel to the inlet 24 in the direction of the header plate 42 adjacent the plenum chamber 16, as well as upwardly to attempt an even distribution of intake air across and among all of the tubes 14, 18. Thus, two distinct primary flow paths are established, one interior to the tubes and driven by the blower 20 and the other exterior to the tubes driven by blower 26.

The evaporative structure including the tubes 14, 18, padding 32 interposed along the evaporation path and header plates 42 provides a large wet surface contact area traversed by air distributed by the blower 26. Evaporation path air is forced over and about the moistened and water sprayed padding and through some of the spray and falling water droplets. This results in evaporation, humidifying evaporation path air. Evaporation also chills the padding 32, the tubes 14, 18 and the dry flow path air interior to the tubes 14, 18. The large number of tubes 14, 18 combined with their small internal cross-sectional area and high thermal conductivity allow large volumes of air to be rapidly processed. For example, a structure having an array of 96 1-inch (2.5 cm) diameter tubes of 15 inches (38 cm) length, utilizing a 225 C.F.M. (6300 liters/minute) blower 26, may be used to drop the temperature in a 1500 cubic ft. (42,500 liter) room to the wet-bulb temperature with desired humidity levels in the span of about 20 minutes, with an energy consumption rate on the order of only 300 watts.

A temperature sensor (not shown), located in the outlet chamber of the dry air flow path, is coupled to an electromagnetic relay (not shown) to operatively disconnect the heating element upon sensing a high temperature condition and thus provide a safety shutoff in the event of excess heat build-up.

Figure 11:
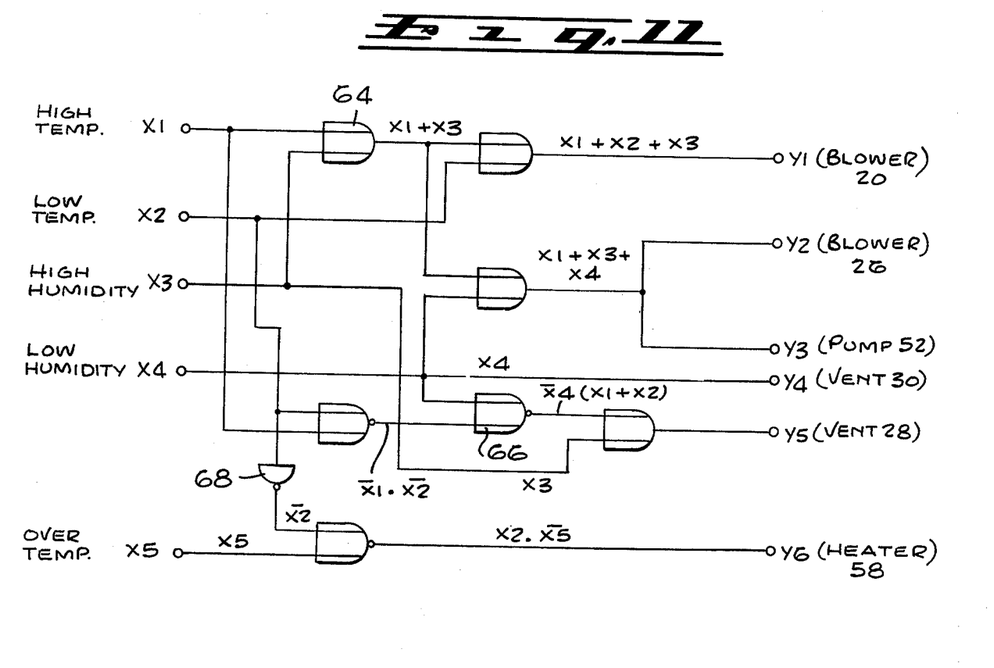
FIG. 11 is a block diagram of a logical gating circuit to implement the relationships of the truth table of FIG. 10.

A control jack 60 is electrically coupled to the logic circuit depicted in FIG. 11 and is located adjacent the inlet duct 32. A control unit 62 includes the high and low temperature and humidity sensors, and is coupled to the jack 60 by an electrical conduit terminating in a plug. The temperature sensors are adjustable high and low temperature sensing thermostats with a 2½% tolerance range. The humidity sensor is a settable low humidity sensing humidistat having a ±2½% relative humidity hysteresis range. The control unit 62 thus provides control signals or indications to the logic circuit when temperature and humidity rise or fall above or below preset levels. To avoid inaccurate humidity and temperature readings, the control unit is located remote from the enclosure 10.

Figure 6:
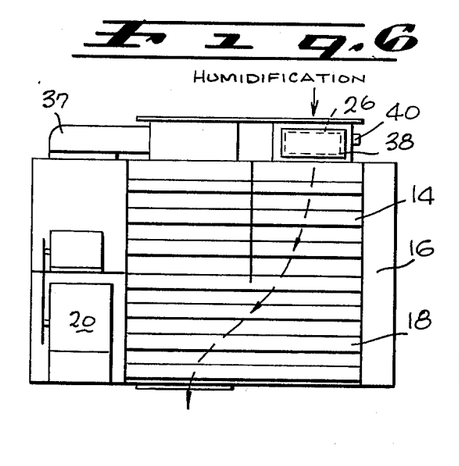
FIG. 6 is a schematic elevation of the unit depicted in FIG. 1 showing the flow path direction when the unit is operating in the humidification mode.

The environmental control unit herein described integrally controls both the humidity and the temperature by dehumidifying, humidifying, heating and cooling as well as selectively scrubbs air in the confined volumetric region in which the unit is situated. Heating occurs by operating the blower 20 in the outlet of the dry air flow path chamber with the heating element connected. Several other modes of operation may be best visualized by reference to FIGS. 6, 7, 8 and 9 which depict various flow paths for the unit. The humidification mode is depicted in FIG. 6 in which evaporation path air is directed into the room. Some cooling also occurs, and, if the temperature drops sufficiently, the heating element and the dry flow path blower 20 are actuated.

Figure 7:
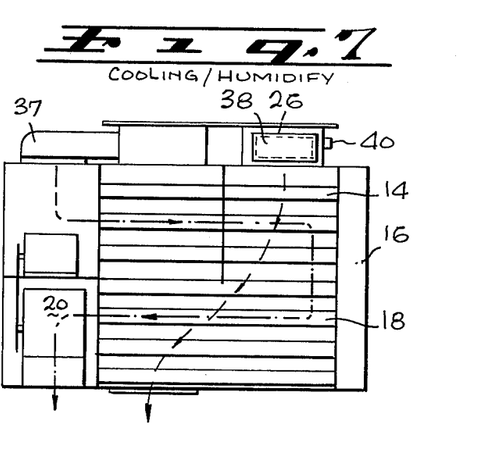
FIG. 7 is a schematic elevation of the unit depicted in FIG. 1 showing the flow path direction when the unit is operating in the dehumidification and cooling mode.
Figure 8:
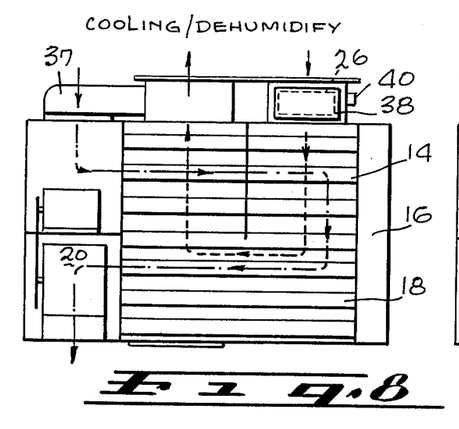
FIG. 8 is a schematic elevation of the unit depicted in FIG. 1 showing the flow path direction when the unit is operating in the heating and humidification mode.

Cooling is accomplished, as viewed in FIGS. 7 and 8, by actuating the blower 20 in the dry air flow path so that air from the confined volume flows through the first group of tubes 14, through the plenum chamber 16 and through the second group of tubes 18. The water pump 52 is actuated to spray water in the evaporation path and on the padding 32 surrounding the tubes 14, 18, and the axial-centrifugal blower 26 is turned on to direct air through the evaporation flow path. If humidification is also desired, as in FIG. 7, the first controllable vent 28 is opened, while the second controllable vent 30 is closed so that humidified air from the evaporation flow path is expelled to the confined volumetric region. As air passes across the moistened tubes 14, 18, the water in the padding 32, as well as some of the water spray, evaporates, chilling the padding 32 surrounding the tubes 14, 18. Heat exchanged between the interior and exterior of the tubes chills the dry flow path air within the tubes which is expelled from the outlet chamber to the confined volumetric region. Humidified air entering the room from the evaporation path also contributes to cooling.

The process of dehumidification is accompanied by cooling and is depicted by the flow diagram of FIG. 8 in which the first controllable vent 28 is open. The baffle 48 extends the evaporation path to prevent air from immediately exiting the vent 28. Moisture in air traveling through the tubes 14, 18 condenses on the tubes' interior from the chilling effect of evaporation external to the tubes. Since the humidified air in the evaporation path is directed outside, the air recirculating through the room is limited to that passing through the dry air flow path. Cooling resulting from heat exchange between the tubes' interiors and the evaporative flow path is compensated on demand by actuation of the heating element when room temperature drops below a preset sensor level.

Figure 9:
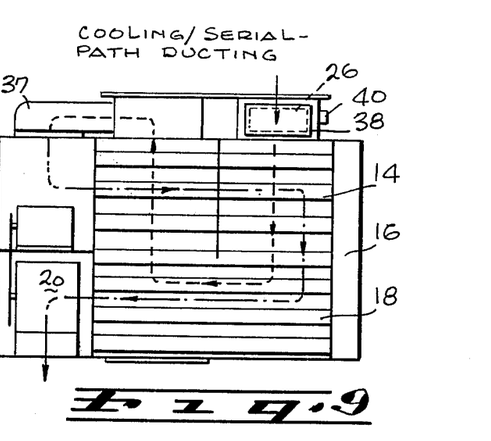
FIG. 9 is a schematic elevation of the unit depicted in FIG. 1 showing the flow path directions when the unit is operating in a cooling and a humidification mode.

Cooling is accomplished with a high degree of efficiency when the dry air flow path is connected in series to the evaporation flow path as in FIG. 9. Highly conductive chilled humid air is further cooled by passage through the dry flow path in heat exchange relationship to the evaporative surfaces to drop the air to approximately the evaporative surface temperature.

Figure 10:
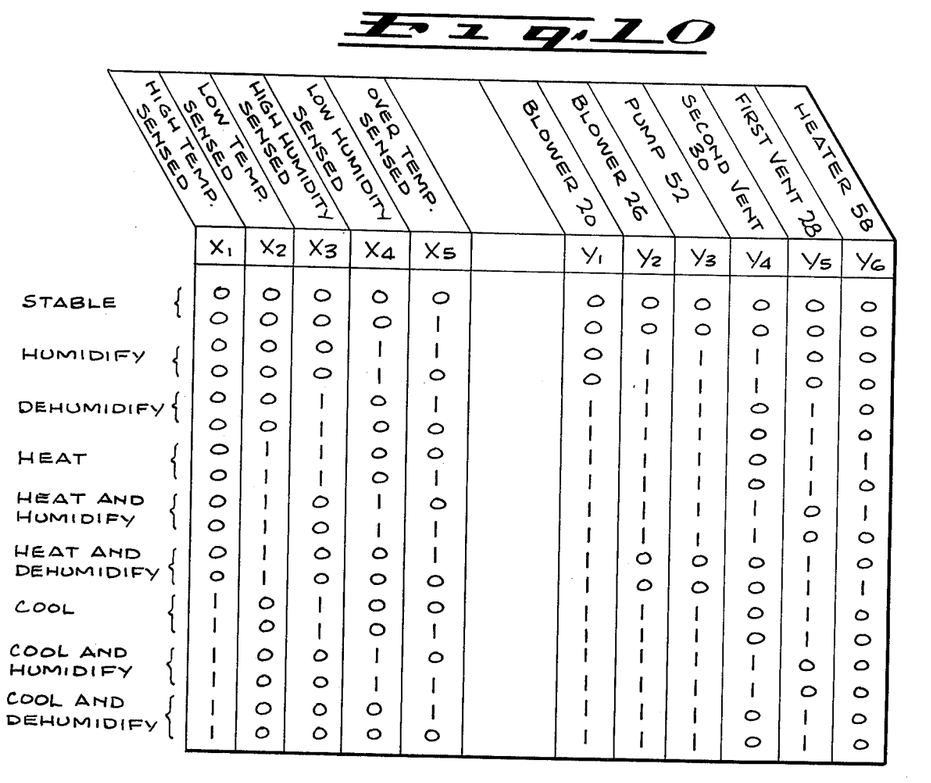
FIG. 10 is a truth table depicting available sensory inputs and desired conditions of operational elements for the given inputs of the unit depicted in FIG. 1.

The truth table shown in FIG. 10 depicts the control sequence which must be actuated in order to operate the unit and properly control the temperature and humidity of the room. The inputs X1, X2, X3, X4 and X5 represent the existence or nonexistence of indications or control signals representing high and low temperature and humidity conditions and the existence of an over temperature condition. Outputs Y1, Y2, Y3, Y4, Y5 and Y6 represent the desired operational states of particular circuit elements within the system for a given combination of the temperature and humidity control signals. The inputs are obtained by the high and low temperature thermostats (not shown) which indicate when the temperature rises above or drops below predetermined values. The low humidity sensor (not shown) indicates when the relative humidity rises above or drops below a predetermined percentage. The over temperature sensor provides the indication X5 when the temperature in the outlet chamber exceeds a predetermined level.

For example, when conditions are stable, none of the output circuit elements are connected, as indicated by zeros beneath each of the outputs, thus limiting energy utilization. When the humidity is high, as in line 5, blowers 20, 26 are actuated along with the pump 52, and the first vent 28 is opened, as indicated by ones. This expels air external to the confined volumetric region.

Figure 12:
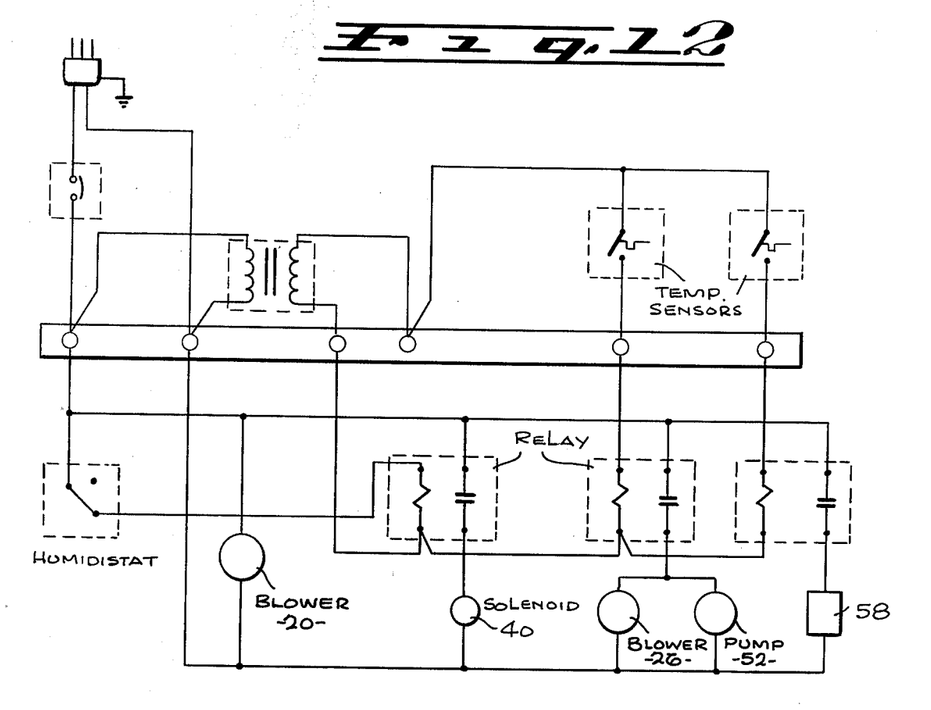
FIG. 12 is a simplified electrical schematic diagram of a control circuit operating the circuit elements in accordance with the truth table of FIG. 10.

Essentially, there are eighteen different desired combined operational states. The truth table may be implemented by electronic gate circuits, as shown in FIG. 11, with inputs and outputs designated in a fashion consistent with prior usage. Amplifiers and actuators, such as solenoids that may be used with the gate circuits have not been illustrated for brevity and because they are conventional. Alternatively, the circuit elements may comprise electromagnetic relays coupled in accordance with the logic diagram, yet simplified because of overlapping operating modes for actuating the blowers, the pump, the solenoid for the vents, and the heating element as indicated in the schematic of FIG. 12.

Normally, the cooling temperature of the unit is limited by the wet-bulb temperature of the evaporative structure. This is, for a given relative humidity, the evaporation temperature of the evaporant, usually water. However, it is possible to reduce the air cooling temperature below the wet-bulb temperature by lowering the spray water temperature. A small amount of energy is required to substantially drop the temperature of water in the reservoir 50 and thus the temperature of air exiting from the unit.

Operative heat loss energy from the dry flow path blower motor may be used to drive an absorption type refrigeration loop to drop the temperature in the reservoir. A heating element may be used to increase the power of the refrigeration loop to rapidly drop the reservoir temperature.

Figure 13:
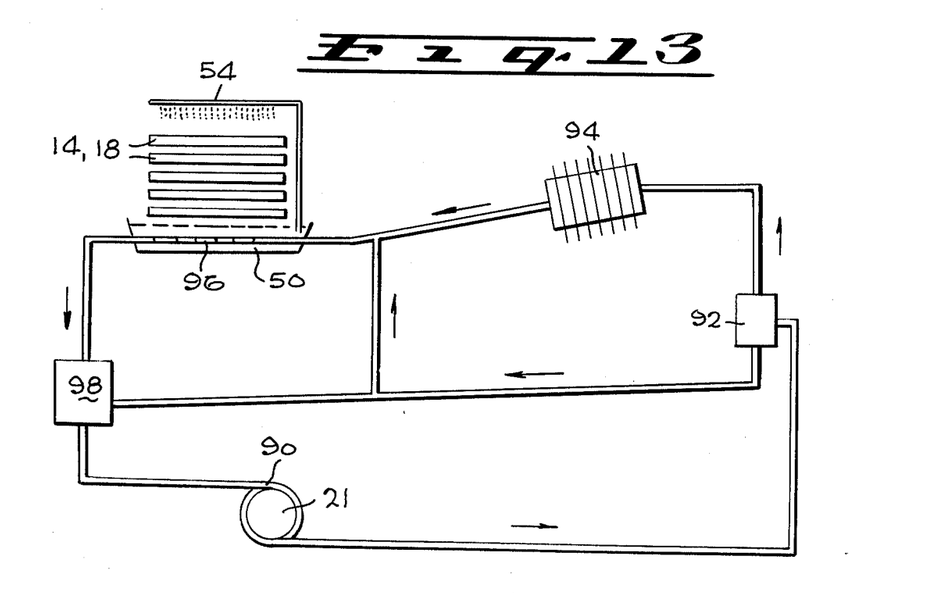
FIG. 13 is a schematic perspective view of a reservoir refrigeration loop in accordance with this invention.

FIG. 13 depicts one such arrangement in which refrigerant conduit 90 encircles the rotor of the first blower motor 21. The conduit 90 contains a refrigerant such as ammonia. This conduit is coupled to a rectifier 92 in which the volatile refrigerant is separated from its liquid carrier. A condenser 94 is coupled to the rectifier 92 to condense the refrigerant. Chill tubes 96 disposed in the reservoir 50 provides an evaporator whereby the condensed refrigerant is allowed to expand, absorbing heat energy from reservoir water. The refrigerant is thereafter compressed and returned by way of an absorber 98 to the motor 21 for heating. In the example shown, a hydrogen loop circulates to enhance the expansion of ammonia gas in the chill tubes as is well known in the refrigeration art. Ammonia is combined with water in the refrigerant conduit 90 circulating about the motor 21 to enhance the energy absorption efficiency. In a water return path from the rectifier 92 to the absorber 98, the ammonia recombines with the water prior to return to the motor adjacent refrigerant conduit 90.

In some examples the motor heat loss energy is insufficient and, preferably, an additional heating element may be used to power the refrigeration loop either in lieu of or in addition to the motor heat loss energy. Other methods of refrigerating the reservoir water are well known to those skilled in the art.

The benefits of chilling the reservoir water are apparent in this enhanced efficiency of the unit in a chilling mode. The high surface contact area experienced by air passing through the evaporation path, combined with recirculation of chilled water draining from the tube coverings 32 and condensed water also returning to the reservoir, provides refrigeration of a combined volume comparable, in many situations to refrigeration type air conditioning at considerably lower power consumption levels.

The environment control unit described automatically compensates for both temperature and humidity conditions in a confined volumetric region. Energy is conserved inasmuch as no compressor is needed and the blowers operate only on demand. Further, the maximum power drain only occurs when the heating element is turned on. Efficiency is aided by high thermal conductivity tubes and the spacial relationship of the padded tubular array. Yet, the unit is portable and may be taken from one darkroom or laboratory and moved to another with minimum effort. Although it is preferable to connect the unit to an external air duct, the unit may be used, except in dehumidification modes, without any coupling of the inlet and outlet ducts 34, 36 of the evaporative flow path to an external environment.

What is claimed is:

1. A climatic environment control unit for altering temperature and humidity of a generally confined volumetric region comprising:
    means defining a dry air flow path having plural flow path channels, the channels having water absorbent exterior coverings, a dry air flow path inlet for collecting air from the confined volumetric region and a dry air flow path outlet remote from the dry air flow path inlet, the dry air flow path outlet for expelling dry flow path air to the volumetric region, and means disposed along the dry air flow path for forcing air therethrough;
    means defining an evaporation flow path including the exterior channel coverings, comprising an evaporation path inlet and evaporation path outlet means and including means for forcing air through the evaporation path, the evaporation path defining multiple flows interposed between and about the exterior channel coverings to provide a high wet areal surface contact traversed by air in the evaporation path and an efficient heat transfer relationship between air in the evaporation and dry air flow paths; and in which
    said evaporation outlet means comprises first and second controllable vents, the first controllable vent for directing humidified air into the confined volumetric region, the second controllable vent for directing humidified air primarily external to the volumetric region for operating the environment control unit in a dehumidification mode, the control unit providing humidification by directing air through the evaporation path across an evaporant and expelling evaporant absorbed air to the confined volume, providing cooling by exchanging heat between air forced through the dry air flow path channels and air forced through the evaporation path and providing dehumidification by directing evaporant absorbed air through the second controllable vent primarily external to the confined volume whereby moisture from air forced through the dry air flow path condenses within the dry air flow path channels.

2. The invention as set forth in claim 1 and comprising means coupled from one of the first and second controllable vents to the dry air flow path inlet to direct chilled humidified air passing through the evaporation path to the dry air flow path, whereby the chilled humidified air is further chilled.

3. The invention as set forth in claim 1 and comprising means responsive to a low temperature indication disposed along the dry air flow path for heating the confined volumetric region and for compensating for cooling during dehumidification; and in which the plural flow path channels comprise elongated tubes and the water absorbent exterior coverings comprise a replaceable padding about each of the tubes.

4. The invention as set forth in claim 3 and in which the means for forcing air through the evaporation flow path comprises a blower having means for forcing air both normal and parallel to the evaporation path inlet distributing air among the tubes in the evaporation path, and comprising a control circuit, the blower being responsive to the control circuit to be actuated when required by the temperature and humidity conditions of the confined volume to limit standby energy consumption.

5. In a humidity and temperature control system for an enclosed volume, the combination comprising:
an evaporative structure including a plurality of thin walled highly conductive heat exchange tubes defining two distinct and separate primary air flow paths, one interior to the tubes and one exterior to the tubes, the exterior flow path being generally transverse to the interior flow path, the interior flow path being in thermal interchange with the exterior flow path, yet without direct fluid interchange therebetween and comprising
porous evaporative covering means disposed in the exterior flow path and in thermal communication with the thin walled tubes;
the covering means comprises loosely fitting fabric disposed about the tubes and further comprising means for actively wetting the porous loosely fitting fabric; and in which
the humidity and temperature control system includes control means for indicated desired changes in humidity and temperature conditions and the interior flow path communicating with the enclosed volume, and comprising:
means responsive to said control means for selectively establishing air flow in the air flow paths; and
means responsive to said control means for selectively controlling admittance of the air flow that is exterior to the tubes into the enclosed volume.

6. The invention as set forth in claim 5 and comprising means responsive to said control means for selectively redirecting admittance of air from the flow that is exterior to the tubes to the interior flow path.

7. The invention as set forth in claim 5 and comprising means responsive to the control means for taking air through the primary flow path exterior to the tubes selectively to outside or inside the enclosed volume.

8. In an environment control unit for regulating humidity and temperature of a confined volume, the combination therewith comprising:
means defining a dry air flow path including multiple channel forward flow paths and multiple channel reentrant flow paths juxtaposed and in opposition to the forward flow paths and in fluid communication therewith;
means defining an evaporation flow path including evaporative surfaces about each of the multiple forward and reentrant channel flow paths to provide a high evaporation contact area, the multichannel forward and reentrant flow paths comprising interiors having small internal cross-sectional areas and means providing high thermal conductivity between the evaporation flow path and the multi-channel interiors to effect an efficient heat transfer relationship between the evaporation and dry air flow paths, both the forward and reentrant channel flow paths passing in heat exchange relationship through the evaporation flow path; and
means for selectively passing air through the dry air flow path and the evaporation flow path.

9. The invention as set forth in claim 8 and comprising means for selectively passing air in the evaporation flow path directly through the unit, or in looped interchange relationship over and about at least a portion of the evaporative surfaces surrounding the multiple flow paths.

10. In an environmental control system for altering the humidity and temperature of an environment, the combination therewith comprising:
an evaporative structure comprising a pair of parallel disposed header plates, the header plates having a two dimensional array of tube-receiving apertures;
a plurality of tubes having opposing ends in sealing relationship to the apertures and disposed generally between the header plates; and
an evaporant absorbing surface padding surrounding each of the tubes, such that air, when confined to the region about the header plate may be directed from outside the structure through the tubes in heat exchange relationship, yet in non-fluid exchange relationship to the evaporative surface paddings surrounding the tubes.

11. The invention as set forth in claim 10 and in which the tubes comprise a plastic material having a metal particulate interspersed therein to provide a substantially inert yet highly thermally conductive, self-supporting fluid transfer conduit, and the evaporant absorbing surface padding comprises removable gauze surrounding each tube.

12. The invention as set forth in claim 11 and in which the header plates comprises an array of tapered tubular flanges defining each of the apertures and receiving the ends of each tube to enable rapid tube removal and replacement for construction and maintenance of the evaporative structure.

13. A climatic environment control unit for regulating temperature and humidity of a generally confined volumetric region comprising:
a partitioned enclosure;
means defining a dry flow path within the enclosure having first and second groups of parallel oriented elongated tubes, each group of tubes having opposing ends, a dry flow path inlet to the enclosure for taking in air from the volumetric region and a dry flow path outlet spaced apart and independent from the dry flow path inlet for expelling dry flow path air from the enclosure to the volumetric region, the inlet disposed in fluid transfer relationship to one end of the first group of elongated tubes, the opposing end of the first group of tubes being in fluid transfer relationship to one end of the second group of tubes and the opposite ends of the second group of tubes being in fluid transfer relationship to the dry air flow path outlet so that air from the confined volumetric region is directed into the dry flow path inlet, through the first group of tubes, through the second group of tubes and through the dry flow path outlet;
a water suspensible padding surrounding each of the elongated tubes;
means defining an evaporation flow path comprising an evaporation path inlet to the enclosure, first and second controllable vents for expelling humid air from the enclosure and means for forcing air through the evaporation path and padding, the evaporation path defining multiple flows interposed between and about the padding to provide a high areal padding contact along the flow path and an efficient heat transfer relationship between air in the evaporation and dry flow paths; and
means for dispensing water to the padding;
the control unit providing humidification by directing air through sprayed and suspended water along the evaporation path and expelling water absorbed air through the second controllable vent to the confined volume, providing cooling by exchanging heat between air forced through the tubes and air forced through the evaporation path and providing dehumidification by directing humidified air through the first controllable vent and primarily external to the confined volume whereby moisture from air forced through the dry air flow path condenses in the tubes.

14. The invention as set forth in claim 11 and comprising:
means for selectively directing air from the evaporation flow path to the dry air flow path to further chill evaporation flow path chilled air.

15. The invention as set forth in claim 13, and in which:
the means for forcing air through the evaporation path comprises a blower adjacent and in fluid transfer relationship to the evaporation path inlet;
the evaporation path inlet and the first ventable duct are disposed adjacent one another and the enclosure comprises means disposed between the inlet and the first controllable vent to prevent a shortened effective evaporation path; and
the water dispensing means comprises a reservoir, a reservoir coupled pump, apertured irrigation channels along the padding, and conduit coupling the pump to the apertured irrigation channels.

16. The invention as set forth in claim 15, and comprising:
a heating element in fluid transfer relationship to the second group of tubes and the dry air flow path outlet; and comprising
means operatively associated with both the first and second ventable ducts so as to open and close the first and second ventable ducts in opposition, the first duct opening in response to an indication, to expel humid evaporation path air to the confined volume, the second duct opening in response to an indication to expel humid evaporation air generally external to the confined volume primarily for dehumidification.

17. The invention as set forth in claim 16 and comprising:
a control system including temperature responsive means for generating an indication related to the temperature of the confined volume, humidification responsive means for generating an indication relative to the humidity of the confined volume and means responsive to both the humidification indication and the temperature indication for selectively actuating the heater element, the dry air path blower, the evaporation path blower, the first and second controllable vents, and the pump.

18. A climatic environment control unit for regulating temperature and humidity of a generally confined volumetric region comprising:
a partitioned enclosure;
means defining a dry flow path within the enclosure, having first and second groups of parallel oriented elongated tubes, the first and second groups of tubes disposed in juxtaposition, each group of tubes having opposing ends, a pair of opposed aperture header plates disposed upright in spaced-apart relationship, the opposing ends of each group of tubes disposed in sealing relationship to the apertures of the plates, a dry flow path inlet to the enclosure for taking in air from the volumetric region and a dry flow path outlet spaced apart from the dry flow path inlet for expelling dry flow path air from the enclosure to the volumetric region, a baffle extending normal to one of the header plates defining an in-take chamber and an outlet chamber and a blower disposed within the outlet chamber to direct air flow through the dry flow path inlet, through the first group of elongated tubes, through the second group of elongated tubes and through the dry flow path outlet, the opposing header plate disposed in facing spaced-apart relation to the enclosure to define a plenum chamber for transfer of air from the first group of tubes to the second group of tubes;
water suspensible padding surrounding each of the elongated tubes;
means defining the evaporation flow path comprising an evaporation path inlet to the enclosure and first and second controllable vents for expelling humid air from the enclosure, a mixed flow blower for generally uniform distribution of air among and about the tubes while forcing air through the evaporation path, the evaporation path defining multiple flows interposed between and about the tubes and through the padding to provide a high areal tube and padding contact and thus an efficient heat transfer relationship between air and the evaporation and dry flow paths;

means for dispensing a water spray over the water suspensible padding comprising an auxiliary inlet disposed adjacent the evaporation path inlet to receive room air for recirculation through the evaporation path;

the first controllable vent for directing humidfied air into the confined volumetric region, an apertured baffle disposed upright normal to the evaporation path inlet and second controllable vent and situated so as to direct the evaporation path beyond the baffle, to prevent short circuited evaporation path flows when the second controllable vent is opened, the second controllable vent for directing humified air primarily external to the volumetric region for operating the environment control unit in a dehumidification mode, the control unit providing humidification by directing air through the evaporation path over and about spray wetted padding and expelling water absorbed air to the confined volume, providing cooling by exchanging heat between air forced through the tubes and air forced through the evaporation path and providing dehumidification by directing humidified air to the second controllable vent primarily external to the confined volume whereby moisture from the air forced through the air flow path condenses in the tubes.

19. The invention as set forth in claim 18 and comprising:

means defining a path from the second controllable vent to the dry flow path inlet for selectively directing chilled air from the evaporation flow path through the dry flow path to further chill air expelled from the dry flow path outlet.

20. The invention as set forth in claim 18 and comprising a water reservoir, a pump coupled to withdraw water from the reservoir, a plurality of apertured spray channels disposed in parallel, spaced-apart relationship along the upper portions of the enclosure over the padding to dispense a water spray over the padding, and conduit coupling the spray channels to the pump;

a solenoid operatively associated with the first and second controllable vents to open and close the controllable vents in opposition, the first controllable vent for directing humidified air into the confined volumetric region, the second controllable vent for directing humidified air primarily external to the volumetric region for operating the environment control unit in a dehumidification mode;

the evaporation inlet and the second controllable vent being disposed adjacent one another and an auxiliary inlet vent in fluid transfer relationship to the evaporation path blower to recirculate air in the confined volume through the evaporation path.

21. The invention as set forth in claim 20 and comprising:

means coupled to receive condensed water from the first and second groups of tubes and transfer the condensed water to the reservoir;

a position sensitive mercury switch operatively coupled to disconnect power from the environment control unit when the angle of the control unit is disposed greater than a fixed angle from a level surface;

a heating element disposed within the outlet chamber to deliver warm air to the room on demand; and means operatively associated with the heating element to deactuate the heating element in response to an excess temperature condition.

22. The invention as set forth in claim 20 and comprising a control circuit for directing the modes of operation of the unit, the control circuit comprising:

temperature sensor means for providing a first indication when the temperature in the confined volume exceeds a first temperature and for providing a second indication when the temperature in the confined volume is below a second given temperature, humidity sensor means for providing a humidity indication when the relative humidity in the confined volume is above a given level and a low humidity indication when the relative humidity is below a given level;

the control circuit further comprising switching means for actuating the heater element in response to the low temperature indication, deactuating the heater element in response to the high temperature indication, actuating the water pump and the evaporation path blower in response to the high temperature indication, the low humidity indication or the high humidity indication, controlling the solenoid to open the first vent in response to the low humidity indication and opening the second vent in response to the high humidity indication or the high temperature indication.

23. In an environmental control system for regulating the temperature of an enclosed volume, the system being of the type including an evaporative structure and means for passing air across the evaporative structure to chill the air near the evaporation temperature of an evaporant on the structure, the combination therewith comprising:

means including the evaporative structure for defining an evaporation flow path;

means for wetting the evaporative structure with an evaporant having a characteristic evaporation temperature;

means coupled to the wetting means for chilling the evaporant for reducing the temperature of the evaporative structure beneath the evaporation temperature of the evaporant.

24. The invention as set forth in claim 23 and in which:

the wetting means comprises an evaporant reservoir;

the means coupled to chill the evaporant comprises an absorptive refrigeration loop including heat transfer means coupled to the reservoir for absorbing heat energy therefrom; and comprising means defining a dry air flow path in heat exchange relationship to the evaporative structure, the system for chilling air passing through the dry air flow path to below the evaporation temperature of an evaporant wetting the evaporative structure.

25. The invention as set forth in claim 24 and in which:

the evaporative structure comprises a plurality of covered tubes, the evaporation flow path passes through and about the coverings on the tubes and the dry flow path passes through the tubes; the system further comprising motor means for passing air across the evaporative structure and through the dry air flow path, the motor means radiating heat energy operating losses and the refrigeration loop being at least partially driven by the operating heat energy radiating by the motor means.

26. The invention as set forth in claim 23 and in which:

means defining a dry flow path having plural flow path channels, the channels having water absorbent exterior coverings, a dry air flow path inlet for collecting air from the confined volumetric region and a dry air flow path outlet for expelling dry flow path air to the volumetric region and means disposed along the dry air flow path for forcing air therethrough;

the evaporation flow path including the exterior channel coverings, the unit comprising an evaporation path inlet and evaporation path outlet means and including means for forcing air through the evaporation path, the evaporation path defining multiple flows interposed between and about the exterior channel coverings to provide a high wet areal surface contact traversed by air in the evaporation path and an efficient heat transfer relationship between air in the evaporation and dry air flow paths;

the wetting means including a reservoir;

refrigeration means including means immersed within the reservoir to drop the evaporant temperature below the wet-bulb temperature of the evaporative surfaces to chill air passing through the dry flow path below the wet-bulb temperature of the evaporant; and control means responsive to a high temperature indication for actuating the wetting means and both the dry flow path air forcing means and the evaporation path air forcing means.

27. An environmental control unit for regulating humidity and temperature of a confined volume comprising:

means defining a dry air flow path having plural flow path channels, the channels having water absorbing exterior coverings, a dry air flow path inlet for receiving air from a confined volumetric region and a dry air flow path outlet for expelling dry flow path air to the volumetric region;

means defining an evaporation flow path including the exterior channel coverings, comprising an evaporation path inlet and evaporation path outlet means and including means for forcing air through the evaporation path, the evaporation path defining multiple flows interposed between and about the exterior channel coverings to provide a high wet areal surface contact traversed by air in the evaporation path and an efficient heat transfer relationship between air in the evaporation and dry air flow paths;

the channels comprise round, elongated tubes and the exterior coverings comprise a replaceable water absorbent padding about each of the tubes, the tubes comprising a high thermally conductive, corrosion resistant material, the tubes defining generally parallel forward and reentrant flow paths in opposing flow directions, the unit comprising plenum means for receiving dry flow path air from the forward flow path and thereafter directing the dry flow path air through the reentrant flow paths; and in which the means for forcing air through the evaporation flow path comprises a mixed flow blower for distributing air in a generally uniform manner among the plurality of tubes.

28. The invention as set forth in claim 27 and comprising control means including a humidity sensor for providing an indication when the humidity drops below a settable level and temperature responsive means for providing an indication when the temperature exceeds present levels, the control means coupled to actuate the wetting means and the mixed flow blower to dehumidify and chill air circulating to the confined volumetric region in response to high temperature and high humidity indications.

29. A method of controlling the environment of a generally confined volume, employing a wettable, high surface area heat transfer structure having an exterior and interior flow paths in heat exchange relationship to the exterior, comprising the steps of:

selectively directing air through the interior flow paths of the heat transfer structure:

spraying an evaporant continuously on the exterior of the heat transfer structure; and continuously blowing air across the exterior of the heat transfer structure; and in which the air blowing across the exterior of the heat transfer structure is directed away from air directed through the interior flow paths; and the steps of directing air through the interior flow paths and spraying an evaporant is selected to be such that condensation occurs within the interior flow path, dehumidifying the air passed therethrough.

30. The method as set forth in claim 29 and comprising the step of:

recirculating a portion of the sprayed evaporant to aid in maintaining chilled evaporant temperature levels.

31. The invention as set forth in claim 30 and comprising the step of:

replenishing and draining a portion of the sprayed evaporant to discharge impurities collected therein.

32. The invention as set forth in claim 29 and comprising the step of:

redirecting air blowing across the exterior into the interior flow paths to chill air below ambient temperature, passage across the exterior partially chilling the air, the air being further chilled by passage through the interior flow paths to approximately the temperature of the exterior.

33. The invention as set forth in claim 32 and comprising the step of:

chilling the evaporant below its characteristic wet-bulb temperature to chill air below the wet-bulb temperature of the evaporant.

34. The method as set forth in claim 29 and wherein air is directed through the interior flow paths to cool air when the ambient temperature of the confined volume exceeds a high temperature level; and further comprising the steps of directing air blown across the exterior of the structure to the confined volume when the humidity of the confined volume is below a low humidity level, to humidify the confined volume; and directing air blown across the exterior of the structure outside the confined volume when the humidity of the confined volume exceeds a high humidity level.

* * * * *